United States Patent [19]

Gunther et al.

[11] Patent Number: 5,541,825
[45] Date of Patent: Jul. 30, 1996

[54] DUAL IMAGE CHMSLS WITHOUT HOLOGRAPHY

[75] Inventors: John E. Gunther, Torrance; Michael Virgadamo, Pasadena; John E. Wreede, Azusa, all of Calif.

[73] Assignee: Hughes Aircraft Company

[21] Appl. No.: 298,825

[22] Filed: Aug. 31, 1994

[51] Int. Cl.$^6$ ..................................................... B60Q 1/44
[52] U.S. Cl. .................. 362/293; 362/80.1; 362/328; 362/336; 362/309; 340/472
[58] Field of Search ..................... 362/61, 336, 335, 362/338, 268, 333, 330, 329, 328, 80.1, 308, 309, 80, 337, 339, 327, 331, 293, 237, 240, 244; 340/479, 468, 472

[56] References Cited

U.S. PATENT DOCUMENTS

| | | | |
|---|---|---|---|
| 3,735,124 | 5/1973 | Stahlhut | 362/333 |
| 4,652,979 | 3/1987 | Arima | 362/80.1 |
| 4,703,405 | 10/1987 | Lewin | 362/333 |
| 4,823,246 | 4/1989 | Dilouya | 362/336 X |
| 4,862,330 | 8/1989 | Machida et al. | 362/336 X |
| 4,991,073 | 2/1991 | Levin | 362/336 X |
| 5,050,051 | 9/1991 | Machida et al. | 362/80.1 |

Primary Examiner—Denise L. Gromada
Assistant Examiner—Thomas M. Sember
Attorney, Agent, or Firm—Leonard A. Alkov; Wanda K. Denson-Low

[57] ABSTRACT

A stoplight system that includes a light source for providing a light output, and an array of non-overlapping lenslets comprised of first lenslets and second lenslets, each first lenslet configured to refract a portion of the light output of the light source into a first predetermined angular field comprising a central angular region having vertical and horizontal extent, and each second lenslet configured to refract a portion of the light output of the light source into a second predetermined angular field comprising first and second peripheral angular regions that are horizontally on either side of the central angular region, whereby the portions of the light output of the light source that are refracted by the first and second lenslets form stoplight illumination.

7 Claims, 2 Drawing Sheets

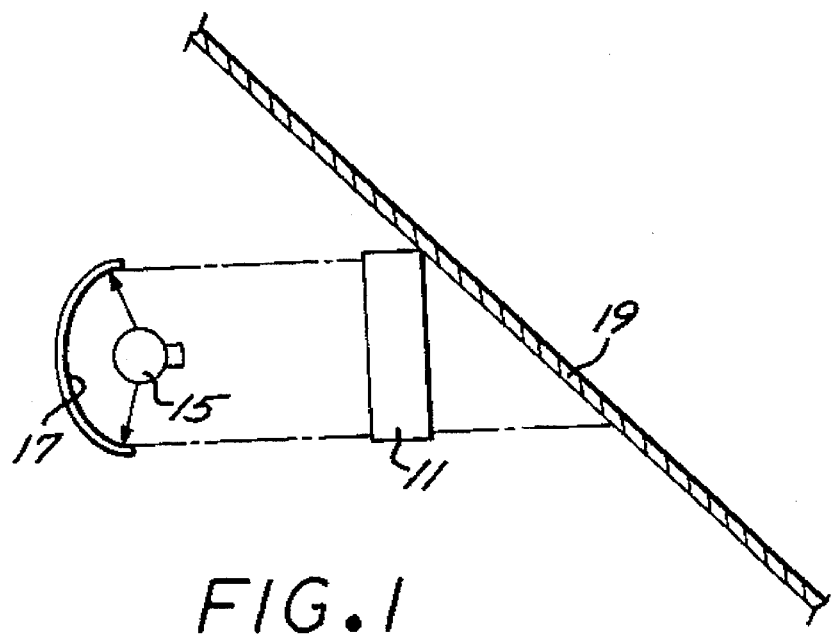
FIG. 1
FIG. 2
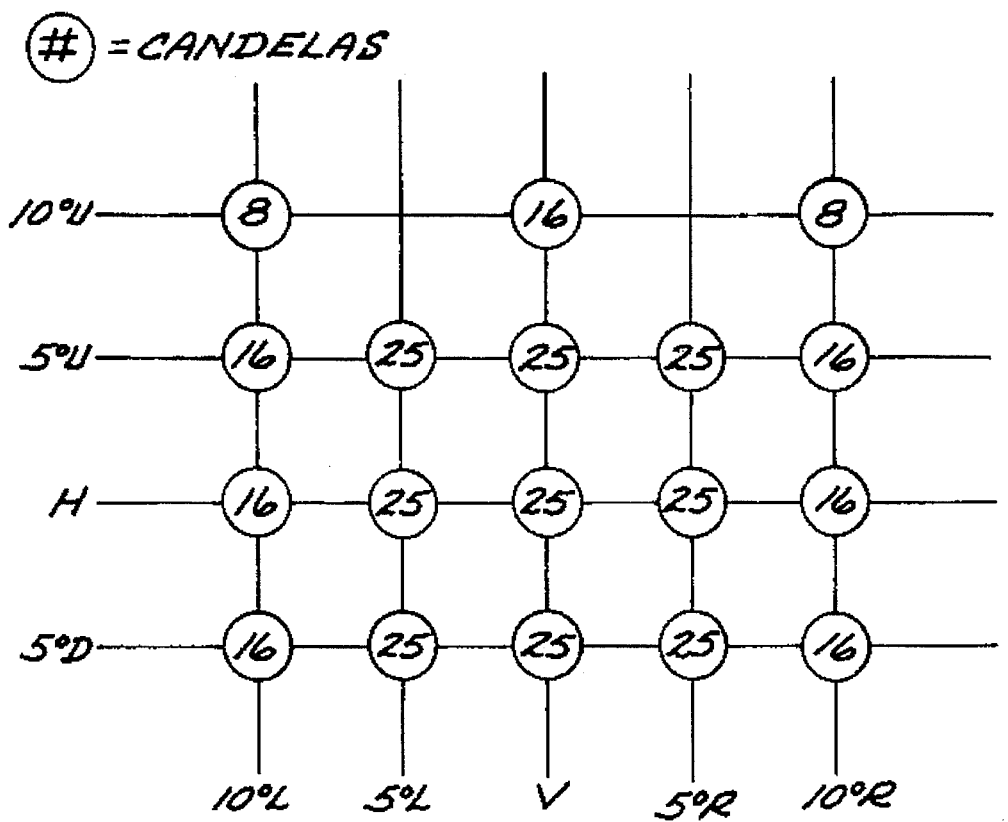

DUAL IMAGE CHMSLS WITHOUT HOLOGRAPHY

BACKGROUND OF THE INVENTION

The disclosed invention is directed generally to center high mounted stoplights for vehicles, and more particularly to a stoplight lens that efficiently meets the required brightness and angular coverage of a center high mounted stoplight.

Present federal regulations require center high mounted stoplights (CHMSLs) in addition to the standard stoplights mounted in the rear portion of an automobile. The high mounted stoplights are intended to maximize the visibility of the automobile braking indicators to drivers following the braking vehicle, and are commonly mounted on the rear window of an automobile.

CHMSLs have commonly been implemented as a standard lenticular colored lens, an illuminating incandescent bulb, and a reflector. In some implementations, the components of a CHMSL are enclosed in a housing that is typically secured adjacent the top or bottom of an automobile rear window, while in other implementations the components of a CHMSL are integrated into automobile body parts such as rear decks, spoilers, roofs.

An important consideration with CHMSLs is the complexity in meeting governmental luminous intensity and angular coverage requirements while utilizing a light source of minimum power. The luminous intensity and angular coverage requirements generally include a quantitative aspect that defines luminous intensity over a defined central angular region, and a qualitative aspect that requires visibility over a horizontal angular region that is greater than the horizontal component of the defined central angular region. Essentially, the regulations require a brighter region generally in the center of the entire angular field of coverage. The luminous intensity and angular coverage requirements can be met by utilizing relatively simple lenses, but much of the light output of the lenses would be in excess of the luminous intensity and angular coverage requirements, which increases the required power of the light source.

SUMMARY OF THE INVENTION

It would therefore be an advantage to provide a center high mounted stoplight system that efficiently meets governmental luminous intensity and angular coverage requirements.

It would also be an advantage to provide a center high mounted stoplight system that displays an image such as a logo or alphanumeric characters without the loss of light that would occur with masking a portion of the stoplight output.

The foregoing and other advantages are provided by the invention in a stoplight system that includes a light source for providing a light output, and an array of non-overlapping lenslets comprised of first lenslets and second lenslets, each first lenslet configured to refract a portion of the light output of the light source into a first predetermined angular field comprising a central angular region having vertical and horizontal extent, and each second lenslet configured to refract a portion of the light output of the light source into a second predetermined angular field comprising first and second peripheral angular regions that are horizontally on either side of the central angular region, whereby the portions of the light output of the light source that are refracted by the first and second lenslets form stoplight illumination.

BRIEF DESCRIPTION OF THE DRAWINGS

The advantages and features of the disclosed invention will readily be appreciated by persons skilled in the art from the following detailed description when read in conjunction with the drawing wherein:

FIG. 1 sets forth a schematic sectional view illustrating a center high mounted stop light that includes a stoplight lens array in accordance with the invention.

FIG. 2 sets forth a luminous intensity distribution graph depicting present vertical and horizontal requirements in candelas for center high mounted stoplights.

DETAILED DESCRIPTION OF THE DISCLOSURE

Figure 3:
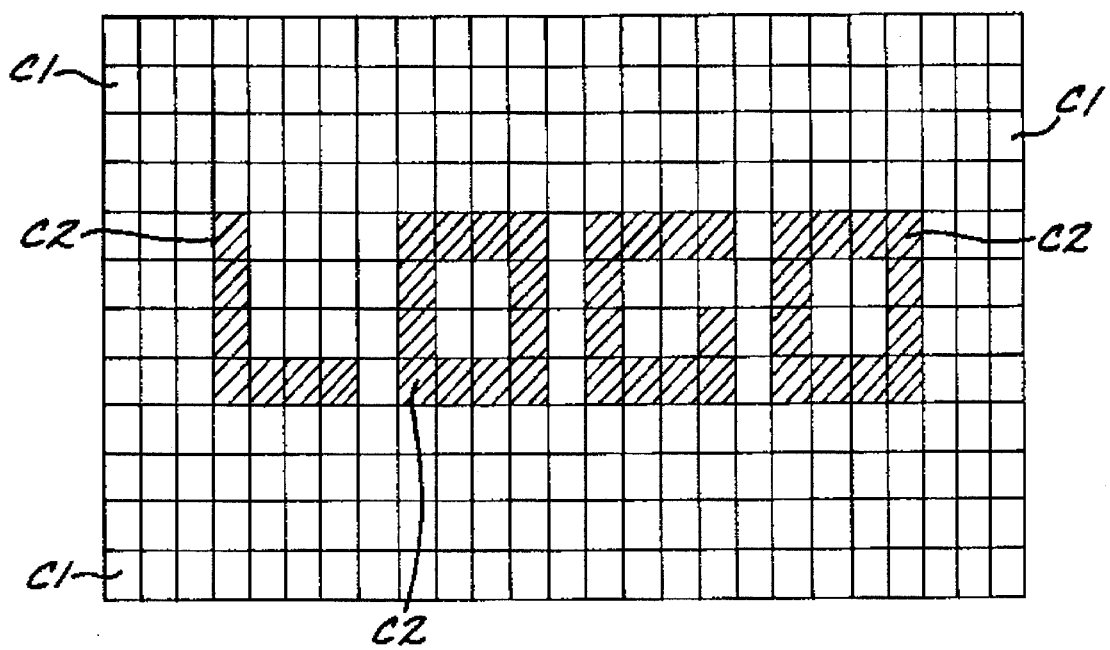
FIG. 3 schematically illustrates the organization of the cells of stoplight lens of the invention.

In the following detailed description and in the several figures of the drawing, like elements are identified with like reference numerals.

Referring now to FIG. 1, set forth therein is a schematic depiction of a center high mounted stoplight system in which a stoplight lens array in accordance with the invention is employed. The stoplight system includes a stoplight lens array 11, an incandescent lamp 15, and a reflector 17 that cooperates with the incandescent lamp 15 to direct a light beam toward the lens array 11 which produces stoplight illumination pursuant to refraction of the light from the reflector 17 and the incandescent lamp 15. By way of specific example, the stoplight lens array 11 is a colored lens that produces an appropriate red stoplight output. Alternatively, a separate red filter can be on either side of the stoplight lens array 11, to the extent the lens array 11 is not colored. Depending upon the particular implementation, a separate red filter might provide more uniform illumination. Although not shown, the stoplight system of FIG. 1 is conventionally housed and appropriately integrated into the vehicle in substantially the same manner as conventional center high mounted stoplights, and the incandescent lamp 15 is connected to the brake light actuating circuit of the vehicle so as to be energized when the brake pedal of the vehicle is depressed. By way of illustrative example, the stoplight system can be located inside a vehicle with the stoplight lens array 11 adjacent the rear window 19.

The stoplight lens array 11 is configured in accordance with the invention to produce, when illuminated by the illumination source 30, first and second images that are respectively visible from behind the automobile in different viewing subfields of a vertical and horizontal viewing field that is required for CHMSLs. As described more fully herein, the stoplight lens 11 comprises an array of lenslets or facets, and the direction or viewability of their light outputs will be described in the context of their orientation in an installed stoplight system. As used herein, the terms angular field and angular coverage will generally refer to all angular regions in space into which light is refracted by a lenslet or cell, and thus refers to the angular region or regions in which the light output of the lenslet is viewable. Since the angular coverage of a cell defines the angular fields in which the light output of the cell can be seen, it should be appreciated that the refracted output of a lenslet or cell is confined to its angular coverage. It should also be appreciated, however, that some light will be scattered outside the angular coverages of the lenslets as a result of the small bulk regions between the edges of adjacent lenslets which cannot be completely avoided in actual implementations. The lenslets of the stoplight lens 11 are configured to produce refracted illumination that is visible from behind the vehicle in which they are installed, and thus their angular fields extend rearwardly away from the vehicle.

Referring now to FIG. 2, set forth therein is a graph showing the luminous intensity (in candelas) versus angular field requirements for a center high mounted stoplight for a central solid angular region defined as (a) 10 degrees up and 5 degrees down relative to a central horizontal plane H that passes through the center of the CHMSL, and (b) 10 degrees left and right relative to a central vertical plane V that passes through the center of the CHMSL and contains the longitudinal axis of the vehicle, as set forth in Federal Motor Vehicle Safety Standards No. 108 ("MVSS 108" herein). The numbers in the graph identify the minimum luminous intensities at those angular locations in candelas, and the entire angular field is subject to a 160 candela maximum at any given angular position.

In addition to the foregoing quantitative requirements, herein called the "central angular region requirements," there is a qualitative requirement that the stoplight be visible within the central horizontal plane over a horizontal angular field of 45 degrees on either side of the central vertical plane (i.e., two horizontal angular regions that are mirror images of each other). By way of example, this qualitative requirement can be interpreted as requiring a luminous intensity of about 1 candela. Such requirement as to visibility with the central horizontal plane over the range of 45 degrees on either side of the central vertical plane shall be called herein the wide angle horizontal requirement.

Referring now to FIG. 3, schematically depicted therein is the stoplight lens 11, with the surface shown being the surface that will face rearwardly when installed in a vehicle. It should be noted that since longitudinally axis of the central angular field is tilted upwardly from horizontal by 2.5 degrees, the stoplight lens 11 is preferably tilted from vertical by about 2.5 degrees, such that the lower edge of the lens is closer to the rear of the vehicle than the top edge of the lens. The stoplight lens 11 comprises a rectilinear array or grid of non-overlapping contiguous cells or facets C1, C2. The C1 cells are depicted by non-shaded rectangles in FIG. 3, while the C2 cells are depicted by shaded rectangles. In accordance with the invention, each C1 cell provides a refracted output having an angular coverage that is the same for all of the C1 cells, and each C2 cell provides a refracted output having an angular coverage that is the same for all C2 cells and different from the angular coverage of the C1 cell. In other words, the C1 cells refract light into respective substantially identical predetermined angular fields, and the C2 cells refract light into respective substantially identical predetermined angular fields that are different from the predetermined angular fields of the C1 cells. Thus, the light output of the C1 cells is visible only in the angular field of the C1 cells, and the light output of the C2 cells is visible only in the angular field of the C2 cells.

More particularly in accordance with the invention, each of the C1 or C2 cells is configured to refract light into an angular field that comprises the central solid angular region depicted in FIG. 2, namely a solid angle having upper and lower limits of 10 degrees up and 5 degrees down relative to horizontal, and lateral limits of 10 degrees on either side of a vertical plane that is parallel to the longitudinal axis of the vehicle. Thus, the solid angular region is centered on a line that passes through the center of a cell, is about 2.5 degrees above horizontal, and is in a vertical plane that is parallel to the longitudinal axis of the vehicle. Each of the other of the C1 or C2 cells of is configured to refract light into an angular field that is comprised of two horizontal regions on either side of the central solid angular region such that the combination of both C1 and C2 cells meets the horizontal wide angle requirement. Such two horizontal regions shall sometimes be called the peripheral horizontal angular regions. The cells that are configured to refract light into the central angular region shall sometimes be called the central region cells, while the cells that are configured to refract light into the peripheral horizontal angular regions shall sometimes be called the peripheral region cells.

It should be appreciated that while the angular coverage of a cell is discussed in terms of precise angles, the actual coverage will typically slightly exceed the constructed angular coverage due to scattering at the small bulk regions between the edges of adjacent cells. Thus, to the extent that the C1 cells and the C2 cells are configured to have respective non-overlapping angular coverages that are contiguous without a gap in coverage, in practice there will be overlap in coverage due to scattering.

Since the C1 cells and the C2 cells are non-overlapping, the light output of stoplight lens 11 as viewed in the angular field of the C1 cells comprises a pattern of light and dark areas wherein the light areas are produced by the C1 cells and the dark areas are produced by the C2 cells, and wherein the light areas correspond to the locations of the C1 cells and the dark areas correspond to locations of the C2 cells. Similarly, the light output of the stoplight lens 11 as viewed in the angular field of the C2 cells comprises a pattern of light and dark areas wherein the light areas are produced by the C2 cells and the dark areas are the result of the C1 cells, and wherein the light areas correspond to the locations of the C2 cells and the dark areas correspond to the locations of the C1 cells. As a further result of the non-overlap of the C1 cells and the C2 cells, the pattern of light and dark areas viewed in the angular field of the C2 cells is the inverse of the pattern of light and dark areas viewed in the angular field of the C1 cells, and thus the stoplight lens produces two images which are the inverse of each other. By way of illustrative example, the pattern of light and dark areas produced by the C1 cells in the angular field of the C1 cells comprises a recognizable pattern such as a name or a logo wherein the name or logo is defined by the dark areas, as schematically illustrated by the shaded C2 cells in FIG. 3, and the name or logo is defined by light areas in the angular field of the C2 cells, which can be visualized in conjunction with FIG. 3 by regarding the C1 cells as being dark and the C2 cells as being light. Stated another way, pursuant to such implementation, the background pattern is light and the foreground pattern (e.g., the name or logo) is dark in the angular field of the C1 cells, while the background pattern is dark and the foreground pattern is light in the angular field of the C2 cells. Of course, the stoplight lens can be implemented to reverse the foregoing, such that the background pattern is dark and the foreground pattern (e.g., the name or logo) is light in the angular field of the C1 cells, while the background pattern is light and the foreground pattern is dark in the angular field of the C2 cells.

In terms of cell size, the C1 cells can be of the same size as the C2 cells, as generally represented in FIG. 1, or the C1 cells can of a size that is different from the size of the C2 cells. The number of C1 and C2 cells in the stoplight lens will depend on the overall shape and size of the stoplight lens and the selected cell size or sizes, wherein cell size can be in the range of about 0.125 inches square to about 0.5 inches square, for example, and is selected pursuant to consideration of factors such as appearance, the nature of the pattern of the arrangement of the C1 and C2 cells, and ease of production. Further considerations for the dimensions of the cells of the stoplight lens include sizing the cells to match the particular automobile design, as well as sizing the cells to achieve appropriate resolution of the recognizable pattern of bright and dark areas of the respective images produced by the stoplight lens in the respective angular fields of the C1 and C2 cells.

In accordance with the invention, the ratio of the total area of the C1 cells relative to the total area of the C2 cells is selected to distribute the light output of the incandescent lamp into the respective angular fields of coverage in such a manner as to meet the desired requirements such as the intensity requirements of MVSS 108. By way of illustrative example, such ratio can be conveniently approximated by multiplying the respective angular coverages by the respective required intensities to arrive at light energy measures for the respective angular coverages. Thus, the light energy for the central region is approximately 20*20*25=10,000 for the simplified case of a constant 25 lumen intensity across the central angular range. The light energy for the peripheral regions is approximately 35*10*2=700, for the example of the peripheral regions having a 10 degree vertical spread. For this example, the ratio of peripheral region light energy to central region light energy is 7/100 and thus a good starting point would be to have the number of peripheral region cells at about 7/100 of the number of central region cells, for the implementation wherein the central region cells and the peripheral region cells are of the same size. The actual ratio would be further refined by taking into account different losses in the central region cells and the peripheral region cells due to different incident and exit angles, and by empirical testing.

Figure 4A:
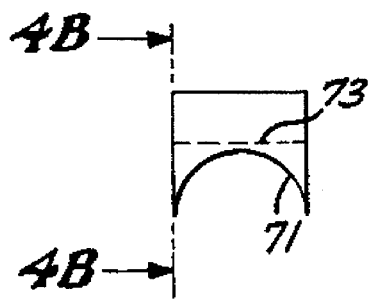
FIGS. 4A and 4B set forth schematic top plan and side elevational views of a central region cell of the stoplight lens of FIG. 3.
Figure 4B:
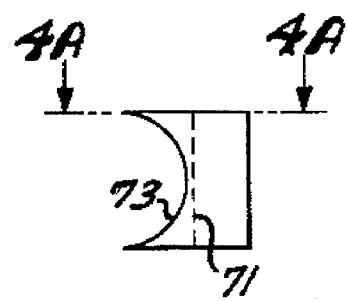

Referring now to FIGS. 4A and 4B, set forth therein are schematic top plan and side elevational views of a central region cell for the illustrative example of a negative concavo-concave lenslet having front and rear surfaces which are respectively concavely curved for controlling spread in respective orthogonal axes. As more particularly shown in FIG. 4A, the rear face comprises a concave cylindrical surface 71 that has a vertical cylinder axis and thus controls the horizontal spread. As more particularly shown in FIG. 4B, the front face comprises a concave cylindrical surface 73 that has a horizontal cylinder axis and thus controls the vertical spread.

While the central region cell illustrated in FIGS. 4A and 4B comprises a negative lens, it should be appreciated that the central region lenses can be positive lenses. Further, the central region cell can be formed of a single spherically curved lens surface on either the front or the rear surface of the central region cell.

Figure 5A:
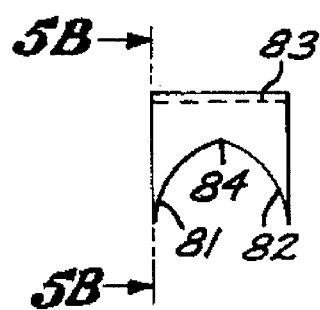
FIGS. 5A and 5B, set forth schematic top plan and side elevational views of a peripheral region cell of the stoplight lens of FIG. 3.
Figure 5B:
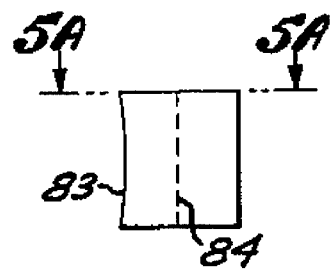

Referring now to FIGS. 5A and 5B, set forth therein are schematic top plan and side elevational views of a peripheral region cell for the illustrative example of a negative concavo-concave lenslet having curved concave surfaces on both rear and front surfaces for controlling spread in respective orthogonal axes. As more particularly shown in FIG. 5A, the rear face comprises abutted concave cylindrical surfaces 81, 82 that have respective non-colinear vertical cylinder axes, and thus control the horizontal spread. As a result of the non-colinear axes of the concave cylindrical surfaces 81, 82, the intersection of such surfaces is a discontinuity at a vertical line 84. As more particularly shown in FIG. 5B, the front face comprises a concave cylindrical surface 83 that has a horizontal cylinder axis and thus controls the vertical spread. Since the vertical spread of the peripheral region is relatively small, it should be appreciated that the radius of the concave cylindrical surface cylindrical surface 83 is relatively large.

While the peripheral region cell illustrated in FIGS. 5A and 5B comprises a negative lens, it should be appreciated that the peripheral region lenses can be positive lenses. Also, the lens surface for controlling the horizontal spread can comprise a continuously curved surface so as to distribute light from +45 degrees to −45 degrees. In such implementation, the light output of the lens as viewed in the central region comprises a pattern of light and dim areas wherein the dim areas are produced by the peripheral region lenslets. The ratio of the total area of the central region cells relative to the total area of the peripheral region cells might be different as compared to an implementation wherein the peripheral region cells refract light only into the peripheral regions, since a portion of the output of the peripheral region cells is in the central region. In other words, the total area of the peripheral region cells might be greater that would be utilized for an implementation wherein the peripheral region cells refract light only into the peripheral regions. As another implementation, a peripheral region cell can be formed of a single compound curved lens surface formed on either the front or the rear surface of the cell.

The stoplight lens array 11 of the invention can be formed as an unitary element, for example by molding, or can be formed of molded lenslet aggregates glued together, wherein each lenslet aggregate comprises a plurality of adjacent lenslets of the same angular coverage. In the latter case, the central region cells can be of the requisite red color while the peripheral region cells can be of a different color such as amber. Also, the stoplight lens array can be formed of individual lenslets glued together, which would also allow for different colors for the different angular coverage regions.

As a further alternative, the peripheral region cells can be of different angular coverages, for example wherein each type of peripheral region cell refracts light into a different portion of the peripheral region, or wherein a further type of peripheral region cell refracts light into a horizontal region that is outside of the required peripheral region.

While the invention has been particularly described as to the specific implementation of a center high mounted stoplight, it should be appreciated that the invention can be implemented as a traditional vehicle stoplight or a vehicle taillight. In such applications, the specific angular regions and the luminous intensity requirements may be different.

The foregoing has been a disclosure of a center high mounted stoplight that efficiently meets governmentally required luminous intensity and angular coverage requirements, and moreover advantageously allows for a stoplight output having a recognizable pattern without wasting light since the light and dark areas of the stoplight outputs are produced without masking.

Although the foregoing has been a description and illustration of specific embodiments of the invention, various modifications and changes thereto can be made by persons skilled in the art without departing from the scope and spirit of the invention as defined by the following claims.

What is claimed is:

1. A stoplight system for a vehicle, comprising:

a light source for providing a light output; and a plurality of non-overlapping lenslets comprised of first lenslets and second lenslets, wherein said second lenslets are of different color than said first lenslets, each first lenslet configured to refract a portion of the light output of the light source into a first predetermined angular field comprising a central angular region having vertical and horizontal extent, and each second lenslet configured to refract a portion of the light output of the light source into a second predetermined angular field comprising first and second peripheral angular regions that are horizontally on either side of said central angular region;

whereby the portions of the light output that are refracted by said first and second lenslets form stoplight illumination.

2. The stoplight system of claim 1 wherein said first lenslets and second lenslets are arranged in a pattern that produces (a) a first stoplight pattern that is viewable in said first predetermined angular field and (b) a second stoplight pattern that is viewable in said second predetermined angular field.

3. The stoplight system of claim 2 wherein said second stoplight pattern is the inverse of said first stoplight pattern.

4. The stoplight system of claim 1 wherein said first lenslets and said second lenslets are of identical size.

5. The stoplight system of claim 1 wherein said second lenslets refract light exclusively into said first and second peripheral angular regions that are horizontally on either side of said central angular region.

6. The stoplight system of claim 5 wherein each of said second lenslets includes first and second abutted curved surfaces having a discontinuous intersection.

7. The stoplight system of claim 1 wherein said second lenslets further refract light into said central angular region.

* * * * *